(No Model.)

F. G. GROVE.
BICYCLE CHAIN BRAKE.

No. 540,977. Patented June 11, 1895.

Witnesses:
L. C. Hills
E. H. Bond

Inventor:
Frank G. Grove.
by E. B. Stocking
Atty.

UNITED STATES PATENT OFFICE.

FRANK G. GROVE, OF LURAY, VIRGINIA.

BICYCLE-CHAIN BRAKE.

SPECIFICATION forming part of Letters Patent No. 540,977, dated June 11, 1895.

Application filed November 9, 1894. Serial No. 528,314. (No model.)

*To all whom it may concern:*

Be it known that I, FRANK G. GROVE, a citizen of the United States, residing at Luray, in the county of Page, State of Virginia, have invented certain new and useful Improvements in Bicycle-Chain Brakes, of which the following is a specification, reference being had therein to the accompanying drawings.

This invention relates to certain new and useful improvements in brakes for bicycles and like chain-driven vehicles, and it has for its object among others to provide a simple and cheap brake that can be applied to any bicycle and which shall act upon the under side of the chain, as when in back-pedaling, the under side of the chain is drawn taut. I provide a brake that shall act directly upon the chain and in one of its forms provision is made for easy adjustment of the parts to compensate for wear. The brake shoe or block may be of any suitable construction. It is supported from the frame so as to be rigid when once adjusted, but capable of adjustment to increase or decrease the distance between the bar upon which it is supported and the driving chain. It is so mounted as not to rattle or become loose or to be accidentally thrown into operative relation with the chain.

Other objects and advantages of the invention will hereinafter appear and the novel features thereof will be specifically defined by the appended claims.

The invention is clearly illustrated in the accompanying drawings, which, with the letters of reference marked thereon, form a part of this specification, and in which—

Figure 1:
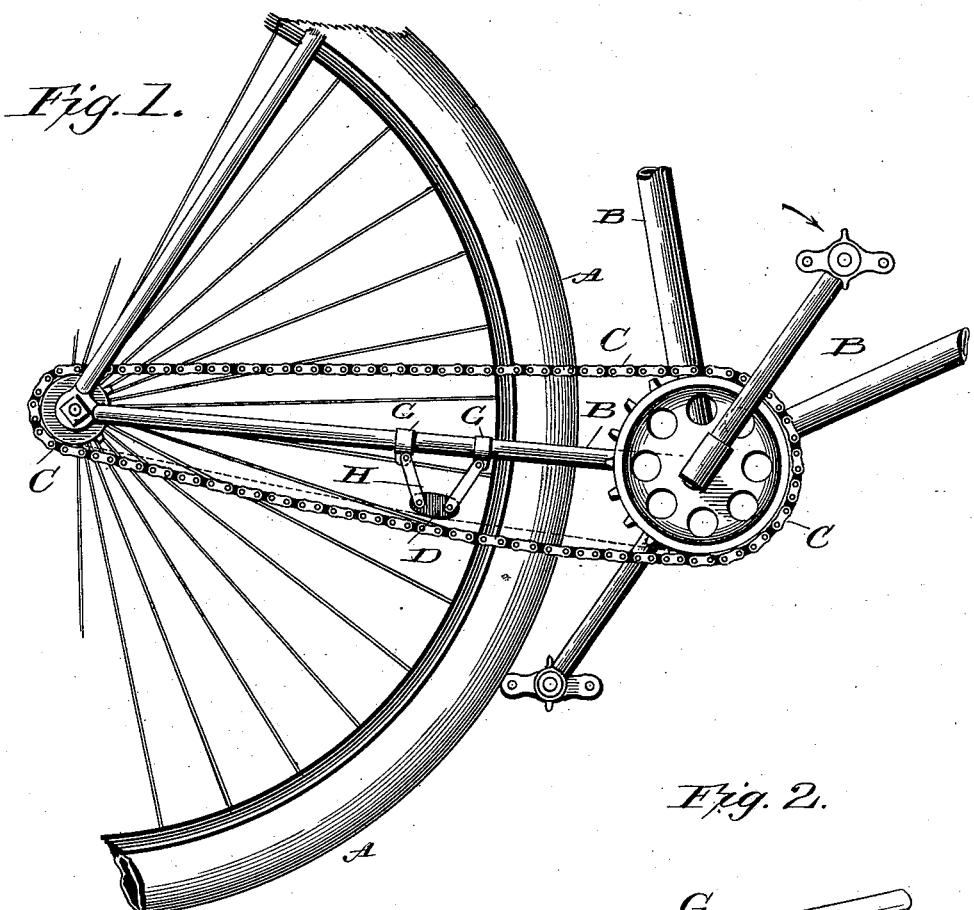
Figure 2:
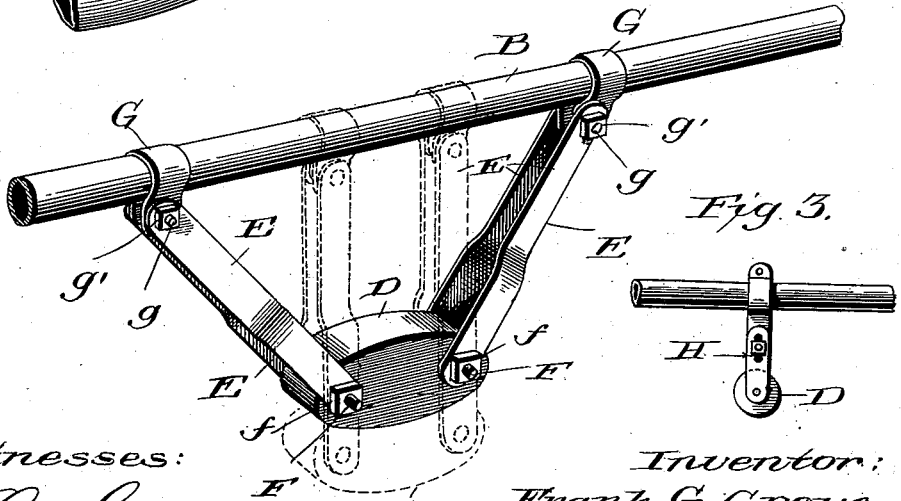
Figure 3:
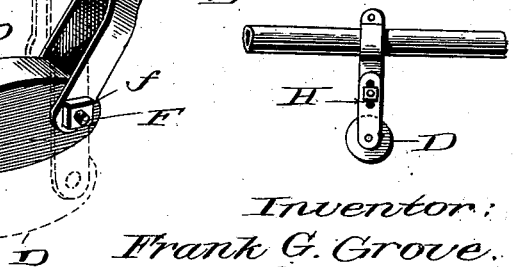

Figure 1 is a side elevation of a portion of a bicycle with my improvement applied thereto. Fig. 2 is an enlarged perspective view of the brake and its attaching means, shown in one position by full lines and in another by dotted lines. Fig. 3 is a detail showing a modified form of brake device.

Like letters of reference indicate like parts in all of the views.

Referring now to the details of the drawings by letter, A designates a portion of a wheel and B a part of the frame of a bicycle of any style or make.

C is the chain.

I support my brake directly upon and from the lower horizontal rod of the frame in such position that it will engage the chain upon the upper face of the lower portion thereof when the same is made taut as in back-pedaling.

As shown in Fig. 2 the brake block is oval in form and may be made of any suitable material. It may be a block of wood, rubber or leather; or a body portion covered with rubber, leather, or any other suitable substance. In this form it is adapted to be reversed when the acting face becomes worn from continued use. This block or brake-shoe D is supported or suspended from the rod in the following manner: E are parallel bars or arms. There are two sets of these arms or bars, the lower ends of which straddle or embrace the opposite ends of the block and are secured thereto as by the bolts F, strained by the nuts $f$. The upper ends of these arms or bars are secured by the bolts $g$ which pass through the same and through the clips or clamps G which are mounted on the rod as shown, the bolts $g$ being retained by the nuts $g'$ as shown.

The position of the brake with relation to the chain can be easily changed by loosening the nuts $g'$ and moving the clips or clamps along the rod as indicated by dotted lines in Fig. 2 and then tightening the nuts. The nuts on the bolts $f$ are normally sufficiently loose to allow a slight pivotal movement of the block at the lower ends of the arms.

Instead of the two sets of arms as above described I may sometimes employ but a single arm as indicated at H in Fig. 3 which may be adjustably secured to the clip on the rod so as to allow for the necessary adjustment as the parts become worn.

In practice the brake is so adjusted that normally the same will be clear of the chain, but when the under part of the chain is drawn taut it will rub against the brake and the latter act as a brake.

Modifications in detail may be resorted to without departing from the spirit of the invention or sacrificing any of its advantages.

The brake block may be in the shape of a roller mounted to revolve on a suitable axis held by the arm or arms that support the same as shown in Fig. 3.

What I claim as new is—

1. A chain retarding device for chain-driven vehicles rigidly mounted to act upon the chain when the lower part thereof becomes taut and thus brought into contact with said device, substantially as specified.

2. A chain retarding device for chain driven vehicles adjustably mounted to be rigidly held to act upon the chain when the lower part thereof becomes taut, substantially as specified.

3. The combination with the chain and frame of a vehicle, of means slidingly mounted on a portion of the frame, a brake shoe carried by said means and mounted to be contacted by the chain when the lower part thereof becomes taut and devices for adjusting the same to vary its distance from the chain and hold it in its adjusted position, as set forth.

4. The combination with a brake-shoe, of arms pivotally connected with opposite ends of the same, and means pivotally connected with the opposite ends of said arms and adapted for adjustable attachment to a bicycle frame, as set forth.

5. The combination with the brake-shoe, of the parallel arms pivotally connected with opposite ends of said brake-shoe and provided with tightening devices, and the clips adapted to be slidingly mounted upon the rod of a bicycle frame and pivotally connected with the other ends of said arms and provided with tightening means, substantially as described.

6. The combination with the chain and frame of a chain driven vehicle, of the chain retarding device fixedly suspended from the side bar of the frame in line with the chain and adapted to be contacted thereby when the adjacent portion becomes taut, substantially as specified.

In testimony whereof I affix my signature in presence of two witnesses.

FRANK G. GROVE.

Witnesses:
W. E. VARNER,
W. A. GROVE.